July 29, 1958  A. A. PETERSON  2,845,274
FEED CHUCKS

Filed Sept. 1, 1955  2 Sheets-Sheet 1

INVENTOR.
Anders Adolf Peterson
BY
Parker, Pardmor Penner
Attorneys.

July 29, 1958  A. A. PETERSON  2,845,274
FEED CHUCKS
Filed Sept. 1, 1955  2 Sheets-Sheet 2

United States Patent Office 2,845,274
Patented July 29, 1958

---

2,845,274

FEED CHUCKS

Anders Adolf Peterson, Elmira, N. Y., assignor to Hardinge Brothers, Inc., Elmira, N. Y.

Application September 1, 1955, Serial No. 531,896

9 Claims. (Cl. 279—23)

This invention relates to improvements in feed chucks or feed fingers of the kind commonly used for advancing the work or stock in automatic screw machines, lathes, or the like. This invention relates more particularly to feed chucks of the type which include springs mounted in a tubular body member and extending toward the interior of the same to grip the work within the body member.

One of the objects of this invention is to provide a feed chuck of this type in which the body member is provided with longitudinally extending slots spaced from each other about the periphery of the body member, and in which improved means are provided for mounting the work engaging springs or pads on the body member. A further object is to provide a spring or pad mounting for a feed chuck of this type which is so formed that the springs exert heavy pressures against the work to be fed without requiring the springs to be made of heavy or thick material.

It is also an object to provide a construction in which the work engaging springs are supported in such manner that they remain releasably attached to the body member when the same is being disassembled. Another object is to provide a feed chuck provided with an internal annular shoulder against which one end of each of the springs may bear and which also prevents work or stock fed to the feed chuck from engaging these ends of the springs.

A further object is to provide a feed chuck of this type which can effectively hold the workpieces adjacent to the discharge end of the feed chuck so as to reduce the waste of material upon which the feed chucks operate. It is also an object of this invention to construct feed chucks of this type in which the springs are held so as to enable them to apply relatively heavy pressures against the work. Another object is to provide springs or pads of improved construction for use in feed chucks of this type.

Other objects and advantages will be apparent from the following description of one embodiment of the invention and the novel features will be particularly pointed out hereinafter in connection with the appended claims.

Figure 2:
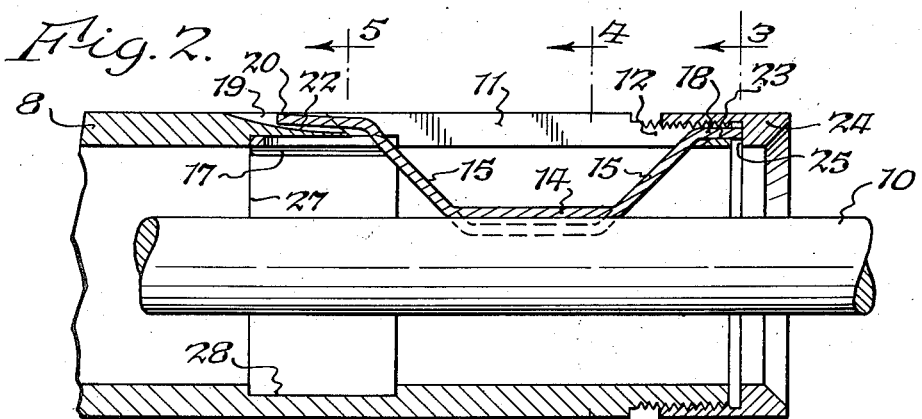
Fig. 2 is a fragmentary sectional view thereof, on an enlarged scale, on line 2—2, Fig. 1.
Figure 3:
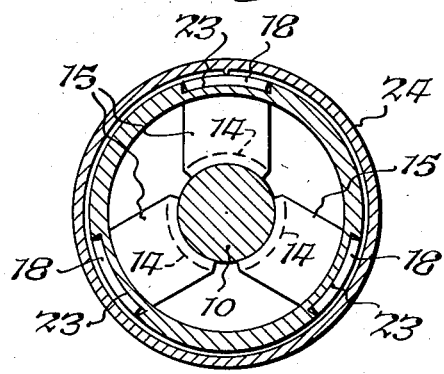
Figure 4:
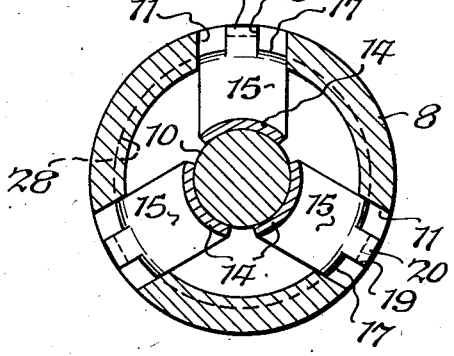
Figure 5:
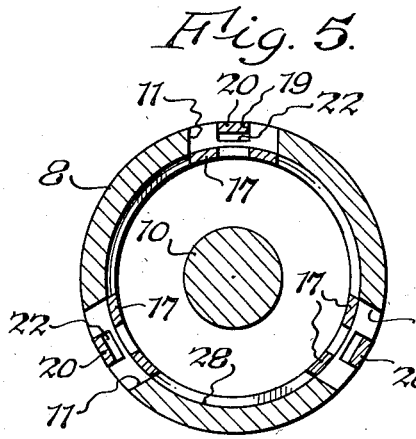

Figs. 3, 4 and 5 are transverse sectional views thereof, respectively on lines 3—3, 4—4 and 5—5 of Fig. 2.

Figure 6:
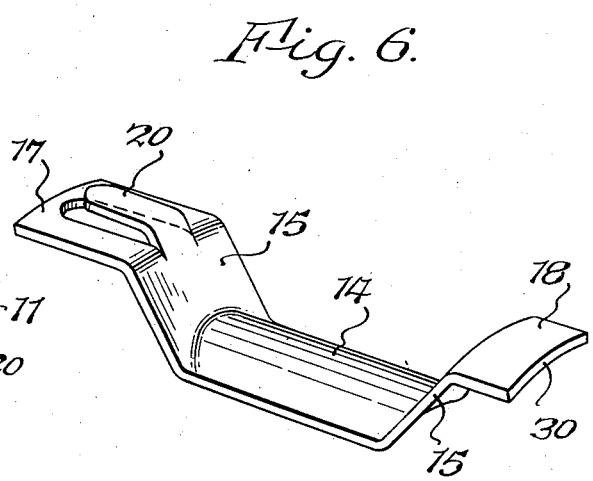

Fig. 6 is a perspective view of one of the springs of the feed chuck.

Figure 7:
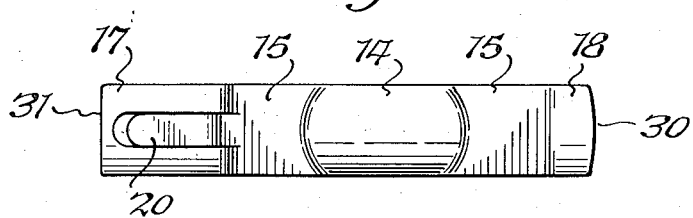
Figure 8:
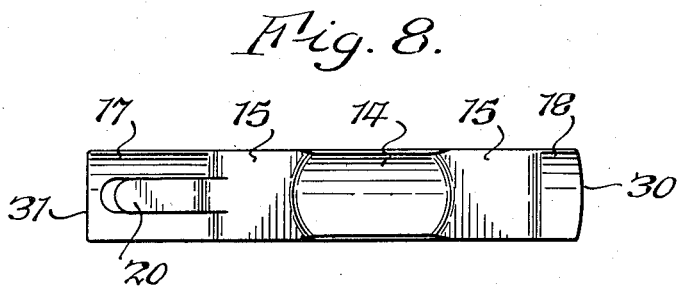

Figs. 7 and 8 are respectively a top plan view and a bottom plan view of the spring shown in Fig. 6.

In the embodiment of this invention shown in the drawings by way of example, 8 represents the tubular body member of a feed chuck. This body member is provided at the receiving end thereof with a threaded part 9 which is formed for threaded engagement with the usual feed tube which is advanced in the direction of its axis whenever the stock is to be fed forwardly. 10 represents a piece of stock with which my improved feed chuck may cooperate.

The body member 8 is provided at intervals about the periphery of the same with slots or cut-out portions 11 arranged intermediate of the ends of the body member. Any desired number of these slots may be provided, three being shown in the construction illustrated. Beyond the outer ends of these slots, the body member is provided at its discharge end with a part 12 of reduced diameter which is threaded on the exterior surface thereof.

The stock to be fed by the feed chuck is engaged by means of springs or pads removably mounted on the body member and preferably arranged in the slots 11. These springs are bowed inwardly so that the middle portions 14 thereof extend toward the axis of the body into position to engage the stock, the extent to which the middle portions of the springs extend toward the axis of the body member depending upon the diameter of the stock to be fed.

The springs also have diverging portions 15 formed integral with the middle portions 14 and extending outwardly therefrom, and one of these diverging portions terminates in a rearwardly extending end 17 while the other diverging portion terminates in a forwardly extending end 18.

It is desirable to provide means for supporting the ends of the springs or spring pads on the body member in such manner that the springs will be capable of exerting the maximum spring pressure against the work, and also to mount the springs so as to facilitate the assembling of the spring chucks and of replacing the springs, either to cooperate with stock of different diameter or cross section, or to replace worn springs. For this latter purpose, the rearwardly extending end 17 of each spring is constructed so as to engage the body member in such a manner as to hold the spring from falling out of the body member when the forward end thereof is not held in place. In the construction shown for this purpose, the end 17 of each spring is bifurcated in such a manner as to cooperate with a part of the body member. In the preferred construction, I punch out of the rearwardly extending end of each spring a finger 20 which is also bent outwardly or offset from the remaining portion of the spring end 17. The body member of the spring chuck is provided at the rear end of each slot 11 with a slot 19 of approximately the width of the finger 20. This groove provides the body with a tapered portion 22 which is so formed as to extend between the finger 20 and the end 17 of the spring, when the finger is inserted into the groove 19. Consequently, this engagement of the rearwardly extending end of each spring and the body member will yieldingly hold the springs on the body member.

Figure 1:
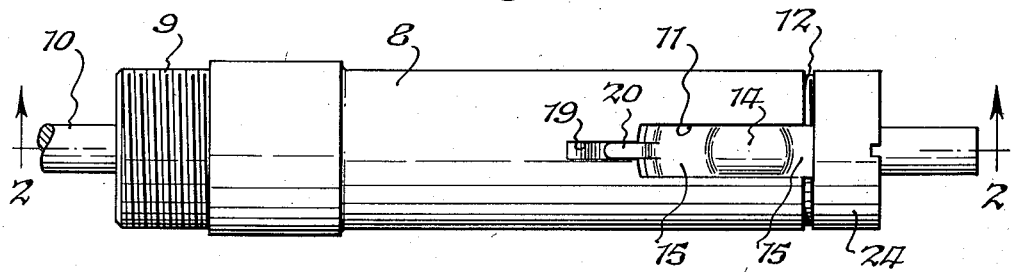
Fig. 1 is a side view of a feed chuck or finger embodying this invention and showing the same holding stock in the form of a rod.

The body member of the feed chuck is also provided on the exterior surface thereof with shallow recesses 23 into which the leading ends 18 of the springs may extend. The springs extend beyond the end of the body member into position to be engaged by a sleeve 24 which has an annular inner shoulder 25 formed to engage the leading ends of the springs. This sleeve has an internally threaded part engaging with the threaded end of the part 12 of the body member and this part of the sleeve also extends over the ends 18 of the springs so as to confine these ends in the recesses 23. When the sleeve is turned so as to move axially toward the left in Figs. 1 and 2, pressure will be applied to the leading ends 18 of the springs by the shoulder 25.

The pressure applied to the leading ends 18 of the springs is opposed at the other ends of the springs so that the intermediate portions of the springs may be urged toward the axis of the body member. This may be accomplished in any suitable manner, and in the construction shown for this purpose, the inner surface of the body member is provided with a shoulder 27 against which the rear or following end 17 of the spring abuts. The shoulder 27 may be formed by cutting a groove 28 of considerable width in the inner surface of the body member adjacent to the rear ends of the slots 11. This groove and the shoulder are of a depth at least equal to the thickness of the material of the end of the spring so that the shoulder not only serves as a stop for the ends 17 of springs, but also protects these ends of the springs against being struck by stock fed into the feed chuck. When the springs are in position as shown in Fig. 2, the ends 17 of each spring will lie entirely in this groove and the finger 20 cut therefrom will lie in the groove or slot 19, so that the spring will be supported in approximately its operative position even when the sleeve 24 is removed from the body member. However, the springs may be easily withdrawn from this position when the threaded sleeve 24 is removed.

The turning of the sleeve 24 in a direction to apply pressure to the leading ends of the springs results in an inward movement of the middle portions 14 of the springs until the same contact with the workpiece 10, whereupon further pressure applied to the springs by the sleeve 24 will necessitate deformation of the springs in such a manner as to exert yielding pressure on the workpiece 10. It is desirable in order to obtain the greatest pressure on the workpiece to have the deformation of the springs take place in the diverging portions 15 of the springs which as a result of pressure may be bowed in either direction from the positions shown in Fig. 2. In order to concentrate the deflection of the springs on the diverging portions 15, it is, of course, necessary to prevent the ends of the springs from being bent to any material extent by the endwise pressure of the sleeve 24. This is accomplished by means of the construction shown by providing at the ends of the spring seats against which the ends of the springs fit and which prevent bending of these ends due to pressure by the sleeve 24. Such a seat is formed for the end 17 of the spring by the internal groove or recess 28 formed within the body member. The ends 18 of the springs are held against bending by being seated in the grooves 22 in which they are held by the threads of the sleeve which prevent radially outward movement of the ends 18 of the springs.

To further resist any bending or flexing of the ends of the springs, these ends are preferably transversely curved to correspond to the curvature of the part of the body member with which they cooperate. It will thus be seen that these curved end portions as shown in Figs. 3 to 6 lie snugly in the grooves 22 and 28 and these curvatures materially increase the resistance of the end portions to bending.

Preferably means are also provided for preventing the bending of the middle or inner portions 14 of the springs, and for this purpose, these intermediate or work contacting portions, when used in connection with work of circular cross section are also curved to correspond approximately to the contour of the work or stock as clearly shown in Figs. 3 and 4. This shape of the middle portions of the spring greatly increases the resistance to bending of these portions of the springs and cause the inner faces of these middle portions to contact the work along extended areas. Consequently, due to this formation of the springs and of the body member, the flexing or bending of the springs will be confined to the diverging portions 15, thus enabling these springs to offer very stiff resistance to any tendency to bend the same, which also makes it possible to construct the springs of lighter material to obtain the desired pressure on the work.

By making the ends of the springs transversely curved, the grooves 22 and 28 may be made of less depth than would be necessary if the spring ends were flat. This is important, since there is very little space available between the outer and inner diameters of the feed chuck, since the outer diameter must be such as to permit the feed chuck to enter the collet of the machine and the inside diameter must be as large as possible to take stock of the largest diameter possible. If these grooves had to be made deeper, the cylindrical wall of the body member would have to be made of greater thickness, thus reducing the capacity of the feed chuck. Consequently, by making the spring ends transversely curved, the range of sizes of stock which the feed collet can handle is increased.

It is also desirable to construct the feed chuck so that the same may feed relatively short workpieces to a collet. For this purpose the springs are arranged as nearly as possible to the leading end of the feed chuck. However, also this property of the feed chuck may be materially improved by forming the end edges of the springs as nearly perpendicular to the length as is possible. Consequently, the end edge 30 of the leading or forward end 18 of each spring is formed to extend as nearly as possible perpendicular to the length of the feed chuck. This also makes it possible to use the full width of substantially all parts of the end 18 of each spring to hold this end against flexing, thus concentrating the bending or flexing on the diverging parts 15 of the spring. A very slight curvature must, of course, be given to these end edges 30 so that they may cooperate to advantage with the shoulder 25 of the tension applying sleeve 24, to frictionally hold the sleeve against rotation.

The other or rear ends of the springs are provided with edges 31 which are made as nearly perpendicular to the length of the feed chuck as is possible so that these edges may bear uniformly at all parts thereof on the shoulder 27. This is made possible by the internal groove 28 in the body member which terminates in the shoulder 27 which also extends at a right angle to the length of the feed chuck.

The feed chuck described has the advantage that by means of the adjustable sleeve 24, the tension of the springs can be easily adjusted and the springs can also be adjusted to cooperate with stock varying slightly in diameter. For greater variations in diameter of the stock, a different set of springs may easily be installed in the body member.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A feed chuck including a tubular body member having a plurality of longitudinally extending slots arranged at intervals about the periphery thereof intermediate of the ends of said body member, a spring in each of said slots having its ends connected with said body member at the ends of a slot and having its middle portion bowed into said body member, one end of said spring being bifurcated to straddle a part of said body member at one end of a slot, and means for applying pressure on the other end of said spring in the direction of the length of the spring.

2. A feed chuck including a tubular body member having a plurality of longitudinally extending slots arranged at intervals about the periphery thereof intermediate of the ends of said body member, a spring in each of said slots having its ends connected with said body member at the ends of a slot and having its middle portion bowed into said body member, one end of said spring having a finger extending in offset relation to said end, said body member at an end of said slot having a tapered portion formed to extend into the space between said finger and said end of said spring, and means for applying pressure against the other end of said spring toward said first mentioned end.

3. A feed chuck including a tubular body member having a plurality of longitudinally extending slots arranged at intervals about the periphery thereof intermediate of the ends of said body member, a spring in each of said slots having its ends connected with said body member at the ends of a slot and having its middle portion bowed into said body member, one end of said spring having a finger extending into spaced relation to said end, said body member at an end of said slot having an inclined groove extending from the outer surface of said body member toward the inner surface thereof and forming a tapered portion formed to extend into the space between said finger and said end of the spring while said finger extends into said groove, and means for applying pressure against the other end of said spring toward said first mentioned end.

4. A feed chuck including a tubular body member having a plurality of longitudinally extending slots arranged at intervals about the periphery thereof intermediate of the ends of said body member, a spring in each of said slots having its ends connected with said body member at the ends of a slot and having its middle portion bowed into said body member, one end of said spring having a finger extending into spaced relation to said end, said body member at an end of said slot having a tapered portion formed to extend into the space between said finger and said end of said spring, and a shoulder on the interior of said body member against which said end of said spring abuts, and means for applying pressure against the other end of said spring toward said first mentioned end.

5. A feed chuck including a tubular body member having a plurality of longitudinally extending slots arranged at intervals about the periphery thereof intermediate of the ends of said body member, a spring in each of said slots having its ends connected with said body member at the ends of a slot and having its middle portion bowed into said body member, one end of said spring being bifurcated to straddle a part of said body member at one end of a slot, an internal groove in said body member formed to receive said end of said spring, and means for applying pressure on the other end of said spring in the direction of the length of the spring.

6. A spring pad for use on a feed chuck, said pad having an intermediate longitudinally extending stock engaging portion terminating at opposite ends thereof in inclined diverging portions extending in angular relations to and away from said stock engaging portions, said diverging portions terminating in ends which extend substantially parallel to said intermediate portion, one of said ends being bifurcated to engage a part of a feed chuck.

7. A spring pad for use on a feed chuck, said pad having an intermediate stock engaging portion which is substantially straight in the direction of its length and terminating at opposite ends thereof in angularly arranged inclined diverging portions, said diverging portions terminating in ends which extend substantially parallel to said intermediate portion, one of said ends having a finger partly punched out of said end and extending in spaced relation to said end to form a bifurcated end.

8. A spring pad for use on a feed chuck, said pad having an intermediate stock engaging portion terminating at opposite ends thereof in inclined diverging portions, said diverging portions terminating in ends which extend substantially parallel to said intermediate portion, said ends being of curved cross sectional shape to resist bending of said ends and said inclined diverging portions being substantially flat to concentrate the bending on said inclined diverging portions.

9. A spring for use on a feed chuck, said spring having an intermediate stock engaging portion terminating at opposite ends thereof in inclined diverging portions, said diverging portions terminating in ends which extend substantially parallel to said intermediate portion, said ends and said intermediate part of said spring being curved in cross section to resist bending and said diverging portions being substantially flat to concentrate the bending of said spring on said diverging portions thereof.

References Cited in the file of this patent
UNITED STATES PATENTS

| | | |
|---|---|---|
| 1,014,563 | Bowden | Jan. 9, 1912 |
| 1,384,229 | Bolich | July 12, 1921 |
| 2,574,869 | Green | Nov. 13, 1951 |
| 2,651,108 | Weems | Sept. 8, 1953 |
| 2,786,686 | MacBlane | Mar. 26, 1957 |
| 2,786,687 | Parsons | Mar. 26, 1957 |